(No Model.) 2 Sheets—Sheet 1.

E. BOWMAN.
CORN PLANTER.

No. 371,028. Patented Oct. 4, 1887.

Witnesses
Percy White
E. Hammond

Ellsworth Bowman, Inventor
By his Attorneys
Fitzgerald & Co.

(No Model.) 2 Sheets—Sheet 2.

E. BOWMAN.
CORN PLANTER.

No. 371,028. Patented Oct. 4, 1887.

Witnesses
Percy White,
E. Hammond,

Inventor
Ellsworth Bowman
By his Attorneys Fitzgerald & Co.

UNITED STATES PATENT OFFICE.

ELLSWORTH BOWMAN, OF ANKENYTOWN, OHIO.

CORN-PLANTER.

SPECIFICATION forming part of Letters Patent No. 371,028, dated October 4, 1887.

Application filed May 26, 1887. Serial No. 239,443. (No model.)

*To all whom it may concern:*

Be it known that I, ELLSWORTH BOWMAN, a citizen of the United States, residing at Ankenytown, in the county of Knox and State of Ohio, have invented certain new and useful Improvements in Corn-Planters; and I do hereby declare the following to be a full, clear, and exact description of the invention, such as will enable others skilled in the art to which it appertains to make and use the same.

My invention relates to machines for planting corn and other seeds; and the invention consists in certain peculiar and novel features of construction and arrangement, as hereinafter described and claimed.

In order that my invention may be fully understood, I will proceed to describe it with reference to the accompanying drawings, in which—

Figure 2:
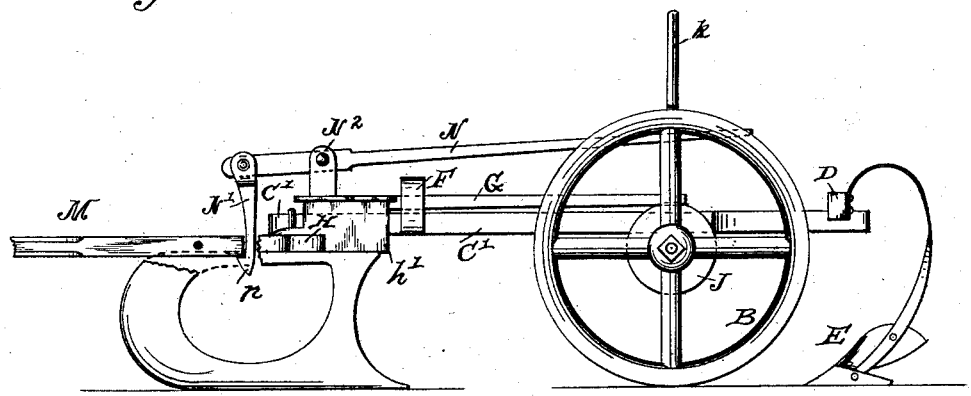
Figure 1:
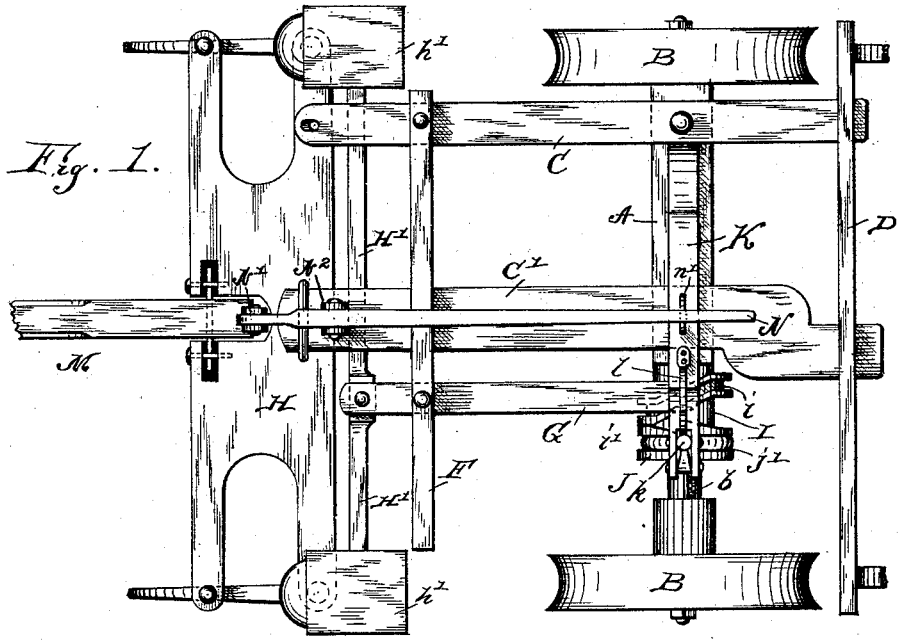
Figure 4:
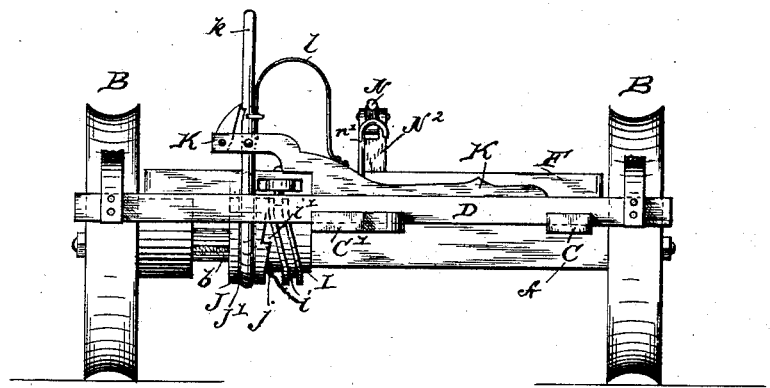
Figure 3:
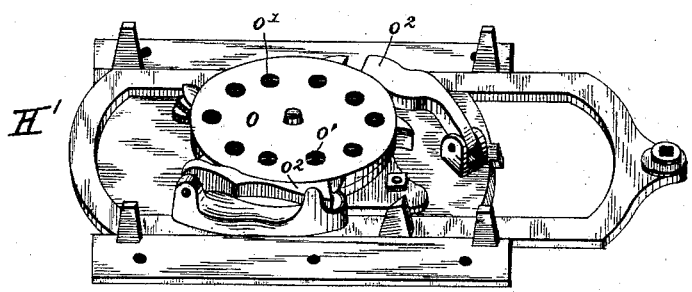

Figure 1 is a plan view of my improved corn-planter. Fig. 2 is a side view of the same. Fig. 3 is a detached view of feeding devices within the seed boxes or hoppers. Fig. 4 is a rear elevation of the same.

In the said drawings, A designates the axle of the planter, upon which are mounted the carrying-wheels B. Upon this axle are secured two longitudinal beams, C C', which extend in front of and behind the axle, as shown. A bar, D, extends transversely of the machine across the rear ends of the beams C C', and to these beams are attached the covering-plows E. The front ends of the beams C C' carry a transverse beam, F, which is slotted at one end to receive the pivoted slide-operating arm G, as shown. The front ends of the beams C C' are secured to the top beam, H, which constitutes the forward frame, and which is mounted upon the two runners $h$. Upon opposite ends of the top beam, H, are mounted the seed boxes or hoppers $h'$.

H' designates the dropping-slide, which works transversely of the machine beneath the boxes $h'$. Near one end of the slide H' is pivoted the front end of the operating-bar G. The rear end of this arm or bar works, by means of a pin and roller, in a cam-groove, $i$, in a sleeve, I, which is mounted loosely on the axle A near one of its ends. The outer end of this sleeve is provided with a ratchet, $i'$, which is engaged by a ratchet, $j$, on the inner end of a collar, J. This collar is mounted upon an extension, $b$, of the hub of one of the wheels B, and is connected to said extension by a spline and feather, so as to slide but not turn upon said extension. The collar J is moved inward and outward by means of a lever, $k$, which is pivoted upon the outer end of a horizontal support, K, secured upon the axle A and extending transversely of the machine. The lower end of the lever $k$ is forked to embrace a groove, $j'$, of the ratchet-collar J, and its upper end is acted upon by a spring, $l$, attached to the support K, so as to hold the collar and sleeve in engagement.

M designates the tongue of the machine, which is pivoted upon the beam H; and N' designates a pendent arm, which is pivoted at its upper end to the forward end of the lever N. This lever N is in turn pivoted upon a forked standard, $N^2$, which extends upward from the front end of the beam C', and its rear end is held down, when desired, by a hook, $n'$, on the support K. The lower end of the arm N' is hooked, as at $n$, so as to engage the inner end of the tongue, and thus raise and lower the seeder-frame, as desired.

Within the boxes $h'$ are placed the feed-wheels $o$, having holes $o'$, and operated by pawls $o^2$ on the slide H', so as to discharge the seed as desired.

It will thus be seen that the check-row line is dispensed with, and that the amount and distance apart of the quantities of corn may be easily regulated and varied.

Having thus described my invention, what I claim as new, and desire to secure by Letters Patent, is—

In a corn-planter, the combination, with the main frame, and the front frame connected to the front end of said main frame, as shown, and carrying the hoppers and seed-slide, of the carrying-wheels B, mounted upon the axle of said main frame, a cam-grooved sleeve, I, mounted rigidly upon said axle, and having a ratchet-face, $i$, on its outer end, the operatinglever G, pivoted upon said main frame and engaging said slide and sleeve, respectively, at its forward and rear ends, an inward extension, b, of the hub of one of said carrying-wheels, a sliding collar, J, working on said extension, and having a ratchet-face, j, on its inner end to engage the ratchet-face i, and the spring-held lever k, mounted on said frame and serving to actuate said collar, all substantially as and for the purposes described.

In testimony whereof I affix my signature in presence of two witnesses.

ELLSWORTH BOWMAN.

Witnesses:
C. C. AMSBAUGH,
LISSA HAMILTON.